(12) United States Patent
Cheyne (10) Patent No.: US 10,442,714 B2
(45) Date of Patent: Oct. 15, 2019

(54) WASTEWATER TREATMENT SYSTEM

(71) Applicant: Matthew Cheyne, Perth (AU)

(72) Inventor: Matthew Cheyne, Perth (AU)

(*) Notice: Subject to any disclaimer, the term of this patent is extended or adjusted under 35 U.S.C. 154(b) by 287 days.

(21) Appl. No.: 15/496,550

(22) Filed: Apr. 25, 2017

(65) Prior Publication Data

US 2018/0305235 A1    Oct. 25, 2018

(51) Int. Cl.
| | | |
|---|---|---|
| *C02F 1/24* | (2006.01) | |
| *C02F 1/40* | (2006.01) | |
| *C02F 3/06* | (2006.01) | |
| *C02F 9/00* | (2006.01) | |
| *C02F 1/00* | (2006.01) | |

(Continued)

(52) U.S. Cl.
CPC ............... *C02F 9/00* (2013.01); *C02F 1/24* (2013.01); *C02F 1/001* (2013.01); *C02F 1/40* (2013.01);

(Continued)

(58) Field of Classification Search
CPC .... C02F 1/001; C02F 1/24; C02F 1/40; C02F 1/78; C02F 3/06; C02F 9/00; C02F 2103/22; C02F 2103/32; C02F 2303/24

See application file for complete search history.

(56) References Cited

U.S. PATENT DOCUMENTS 6,337,023 B1    1/2002   Broussard
6,641,732 B1    11/2003  Cheyne (Continued)

OTHER PUBLICATIONS

"Case Study, Fish Processing Plant Wastewater Treatment" (27 pages).
"Flotation machines" (8 pages), Year: 2015.

*Primary Examiner* — Lucas A Stelling
(74) *Attorney, Agent, or Firm* — Todd R. Miller (57) ABSTRACT

An efficient and economical wastewater treatment system is disclosed. The wastewater treatment system may comprise a first sump for receiving wastewater to be treated. The first sump includes a ring that acts a first focal point to gather the waste and remove solids. Suspended solids are transported from the first sump, through one or more filters, and sent to a second sump. The second sump is preferably in communication with one or more protein skimmers. The second sump preferably includes one or more secondary focal points for gathering suspended solids to be further treated by the one or more protein skimmers. The second sump may include a partition wall that separates the second sump into a main tank and a gathering tank. One or more collecting chambers may be disposed in the gathering tank. Inlet conduits disposed within the main tank create a cross-flow or horizontal vortex that forces water to cascade over the partition wall into the one or more collecting chambers. Each collecting chamber preferably includes a suction line in communication with a protein skimmer. The suction line is positioned within the collecting chamber to divert and reverse the flow of water from the cascading flow over the partition wall to separate and retain suspended solids around the suction line to be transported to a protein skimmer. The first and secondary focal points advantageously do not use chemicals to gather the wastewater. The second sump may be in communication with a third sump, which may be in communication with one or more additional protein skimmers and an outlet pipe for sending treated water out the third sump. The resulting treated water has no smell and is potable. The wastewater treatment system is also significantly less costly in terms of start-up costs compared to conventional systems.

15 Claims, 5 Drawing Sheets

(51) Int. Cl.
*C02F 1/78* (2006.01)
*C02F 103/22* (2006.01)
*C02F 103/32* (2006.01)

(52) U.S. Cl.
CPC ............ *C02F 1/78* (2013.01); *C02F 2103/22* (2013.01); *C02F 2103/32* (2013.01)

(56) References Cited

U.S. PATENT DOCUMENTS

| | | |
|---|---|---|
| 8,268,166 B2 | 9/2012 | Marks |
| 8,753,508 B2 | 6/2014 | Domoulin |
| 9,321,057 B2 | 4/2016 | Hintz |
| 2003/0201232 A1 | 10/2003 | Cheyne |
| 2004/0262231 A1 | 12/2004 | Mikhailovskii |
| 2015/0136708 A1 | 5/2015 | Amato |

WASTEWATER TREATMENT SYSTEM

BACKGROUND

The present disclosure relates generally to the treatment of wastewater and particularly to industrial wastewater formed during seafood processing.

SUMMARY

One exemplary embodiment of the disclosed subject matter is a wastewater treatment system comprising a first sump for receiving wastewater to be treated and a first focal point inside the first sump for gathering the wastewater into a focused area. The treatment system also comprises a filter for screening the wastewater after it leaves the first focal point, and a second sump for receiving the wastewater after it leaves the filter. A second focal point inside the second sump gathers suspended solids from the wastewater contained in the second sump. A protein skimmer receives the suspended solids from the second focal point and returns treated wastewater to the second sump.

The first focal point is preferably a ring inside the first sump. The second focal point preferably includes a horizontal vortex formed by swirling water in the second sump. The first and second focal points advantageously do not use chemicals to gather the wastewater.

The horizontal vortex may be formed by wastewater returning from the protein skimmer at the top portion of the second sump at one end thereof, wastewater from the filter entering at the bottom portion of the second sump parallel to the wastewater returning from the protein skimmer, and wastewater being recirculated in the second sump and pumped into the bottom portion of the second sump opposite where the wastewater enters from the filter.

A partition wall preferably separates the second sump into a holding tank and a gathering tank. A collecting chamber may be disposed at a top portion of the partition wall, wherein the horizontal vortex forces water to cascade over the partition wall into the collecting chamber. The protein skimmer receives the suspended solids from a feed line preferably disposed within the collecting chamber, wherein the feed line is positioned within the collecting chamber to divert and reverse the flow of water from the cascading flow over the partition wall.

The wastewater treatment system may further comprise a third sump for receiving wastewater from the second sump, a second protein skimmer in communication with the third sump, a third protein skimmer in communication with the third sump, a fourth protein skimmer in communication with the third sump, a suction line from the third sump to a pump room, and one or more sprinkler heads in communication with the pump room.

Ozone may be added to the wastewater before it enters the protein skimmer to treat the water. Similarly, a biofilter may be in communication with the filter for further treating the wastewater after it leaves the filter.

Another exemplary embodiment of the disclosed subject matter is a wastewater treatment system comprising a first sump having a ring for receiving and gathering wastewater to be treated, a first filter for screening the wastewater after it leaves the first sump, and second filter for screening the wastewater after it leaves the first screen. The system may further include a second sump having a partition wall defining a main tank and a gathering tank, wherein the gathering tank includes a first collecting chamber disposed atop the partition wall, and wherein the gathering tank includes a second collecting chamber disposed adjacent the first chamber. A first protein skimmer may be in communication with the second sump.

A first inlet may be in communication with second filter, wherein the first inlet is disposed at a bottom corner of the main tank opposite the partition wall. A second inlet may be in communication with first protein skimmer, wherein the second inlet is disposed at a top corner of the main tank opposite the partition wall. The system may also include a pump having a third inlet in communication with the main tank, wherein the third inlet is disposed at a bottom corner of the main tank adjacent the partition wall.

A first feed line may be in communication with the first protein skimmer, wherein the first feed line is disposed in the first chamber of the gathering tank. A second feed line may be in communication with the first protein skimmer, wherein the second feed line is disposed in the second chamber of the gathering tank.

A third embodiment of the disclosed subject matter is a wastewater treatment system comprising a first sump for receiving wastewater to be treated; a first focal point comprising a ring inside the first sump for gathering the wastewater into a focused area; a first filter for screening the wastewater after it leaves the first focal point; a second filter for screening the wastewater after it leaves the first filter; a second sump for receiving the wastewater after it leaves the second filter; a second focal point inside the second sump for gathering suspended solids from the wastewater contained in the second sump; a first protein skimmer for receiving the gathered suspended solids from the second sump; a third sump for receiving wastewater from the second sump; a second protein skimmer in communication with the third sump; a third protein skimmer in communication with the third sump; a fourth protein skimmer in communication with the third sump; a suction line from the third sump to a pump room; and one or more sprinkler heads in communication with the pump room.

This system may further include a partition wall separating the second sump into a holding tank and a gathering tank, and a collecting chamber disposed at a top portion of the partition wall. The first protein skimmer preferably receives the suspended solids from a feed line disposed within the collecting chamber.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DETAILED DESCRIPTION

Wastewater is composed of a variety of inorganic and organic substances constituting impurities in the water. In the case of an industrial wastewater created at a seafood processing plant, such wastewater usually contains large quantities of solids as well as suspended solids. Such impurities may include bits of skin, scales, shell, fats, or greases. Suspended solids are typically comprised of small particles and are measured as total suspended solids ("TSS") expressed as mg TSS/liter of water. A significant reduction in TSS is often difficult and costly to achieve.

Oxygen is required to break large organic molecules into smaller molecules and eventually into carbon dioxide and water. The amount of oxygen required for this process is known as the biochemical oxygen demand ("BOD"). Sewage high in BOD may deplete oxygen in receiving waters, causing ecosystem changes and fish kills. A high BOD typically also results in a foul smell. Thus, one of the most commonly measured constituents of wastewater is BOD, wherein a standard BOD for surface water discharge has been set at 30 mg BOD/L, i.e., 30 mg of $O_2$ are consumed per liter of water over 5 days to break down the waste.

The treatment of wastewater may involve removing impurities until the desired TSS and BOD are obtained. Such treatment typically involves some form of phase separation, oxidation, and sometimes polishing.

During phase separation, the impurities are transferred into a non-aqueous phase. Phase separation may be achieved through a sedimentation or filtration process. Sedimentation uses gravity to allow solids and non-polar liquids that are sufficiently heavier than water to accumulate at the bottom of a settling tank or basin. The wastewater must be in the basin long enough for the desired particle size to be removed. The size of a settling basin to remove a desired particle size may be calculated through Stokes' law. In general, if small particles are desired to be removed, then the wastewater must sit for a long period of time and typically in a large basin. To maintain satisfactory performance of a basin, regular draining and desilting is required to remove the sludge that accumulates at the bottom of the basin.

In contrast to sedimentation, phase separation involving filtration typically does not use gravity but physical screens or sieves that remove particles smaller than the openings through which the wastewater passes. Flocculants (chemicals that cause colloids and other suspended particles in liquids to aggregate) may be used to improve the sedimentation or filterability of small particles. Such chemicals are often quite expensive.

The oxidation process reduces the BOD of wastewater and may reduce the toxicity of some impurities. Biochemical or chemical oxidation may be used. Disinfenction by chemical oxidation kills bacteria and microbial pathogens by adding ozone, chlorine, or hypochlorite to wastewater.

Polishing refers to any of the above and additional treatments to achieve desired purity. For example, chemical reduction or pH adjustment minimizes chemical reactivity of wastewater following chemical oxidation. Such polishing is typically a costly procedure. Filtration through carbon removes remaining contaminants and impurities by chemical adsorption onto activated carbon. Filtration through calcium carbonate or membranes may also be used during polishing.

Conventional wastewater treatment systems are not only large in size and expensive to operate but also capital intensive. For example, a dissolved air flotation system for use in treating wastewater from a seafood processing plant may be USD $3,000,000 or more depending on the situation and requirements. In addition, should regulations or the like require an upgrade or other equipment modification, such a modification is often difficult as well as costly.

Accordingly, a wastewater treatment system that is cost-efficient to operate, inexpensive, easily modified, and capable of outputting treated wastewater with no smell, significant reduction in TSS and BOD, and otherwise solves other problems is desired.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIGS. 1-4 illustrate an embodiment of the disclosed novel system 10 for treating wastewater from any source but preferably an industrial seafood processing plant capable of processing crustaceans (crabs and lobster), saltwater fish (tuna, sardines, pacific whiting, etc.), mollusks (oysters, clams, scallops), or the like. Such processing typically generates wastewater containing significant amounts of dissolved and suspended organic materials resulting in high BOD, chemical oxygen demand or COD, fats, oil, grease, and foul odor.

Unlike conventional wastewater treatment systems utilizing a large basin in which the wastewater must sit undisturbed for a long period of time, the instant invention 10 utilizes a focal point 20 to gather the wastewater into a focused area. Doing so leads to unexpected results such as increased efficiency and treatment of the wastewater, as disclosed herein.

Figure 1:
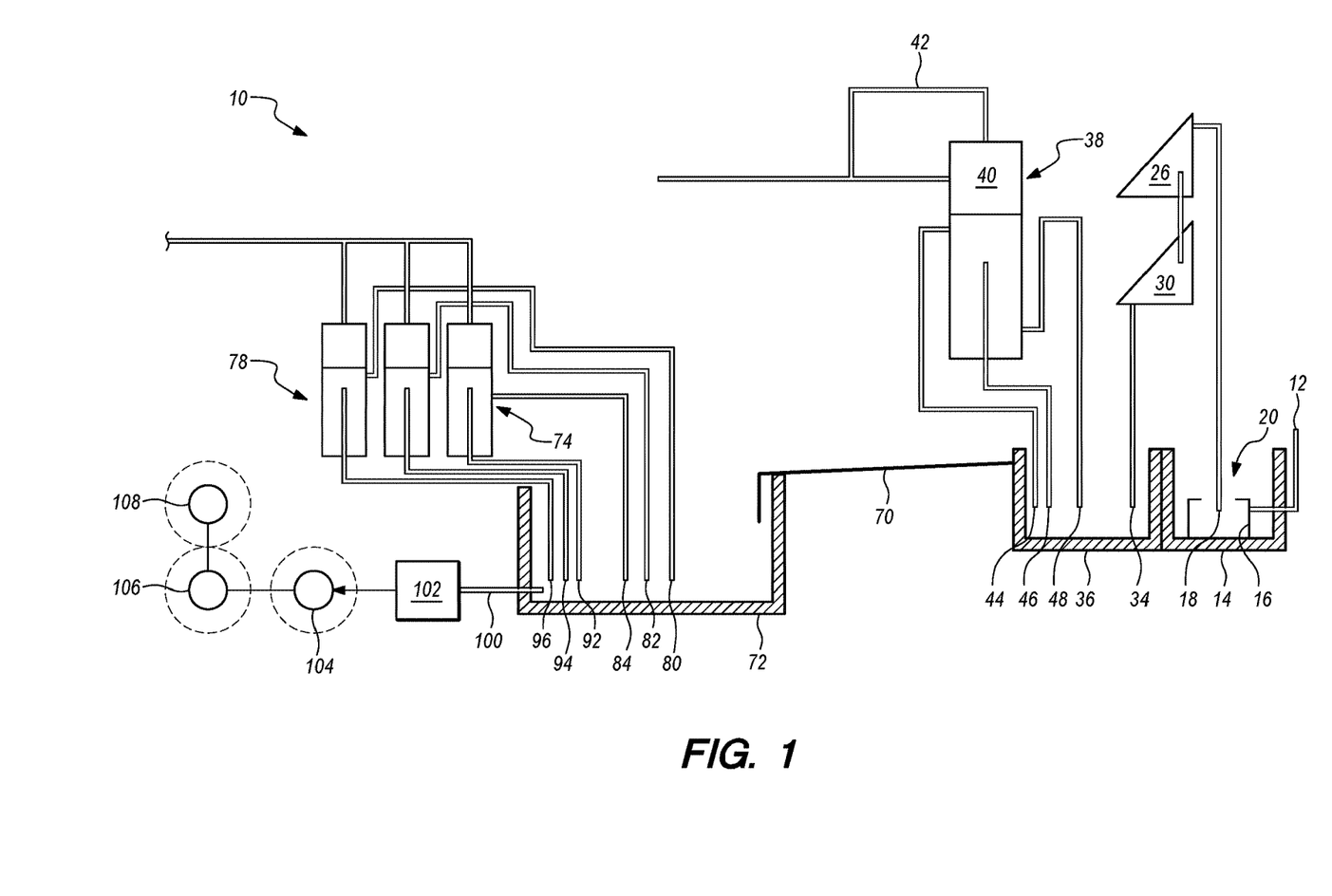
FIG. 1 is a schematic representation of an embodiment of the wastewater treatment system disclosed herein.
Figure 2:
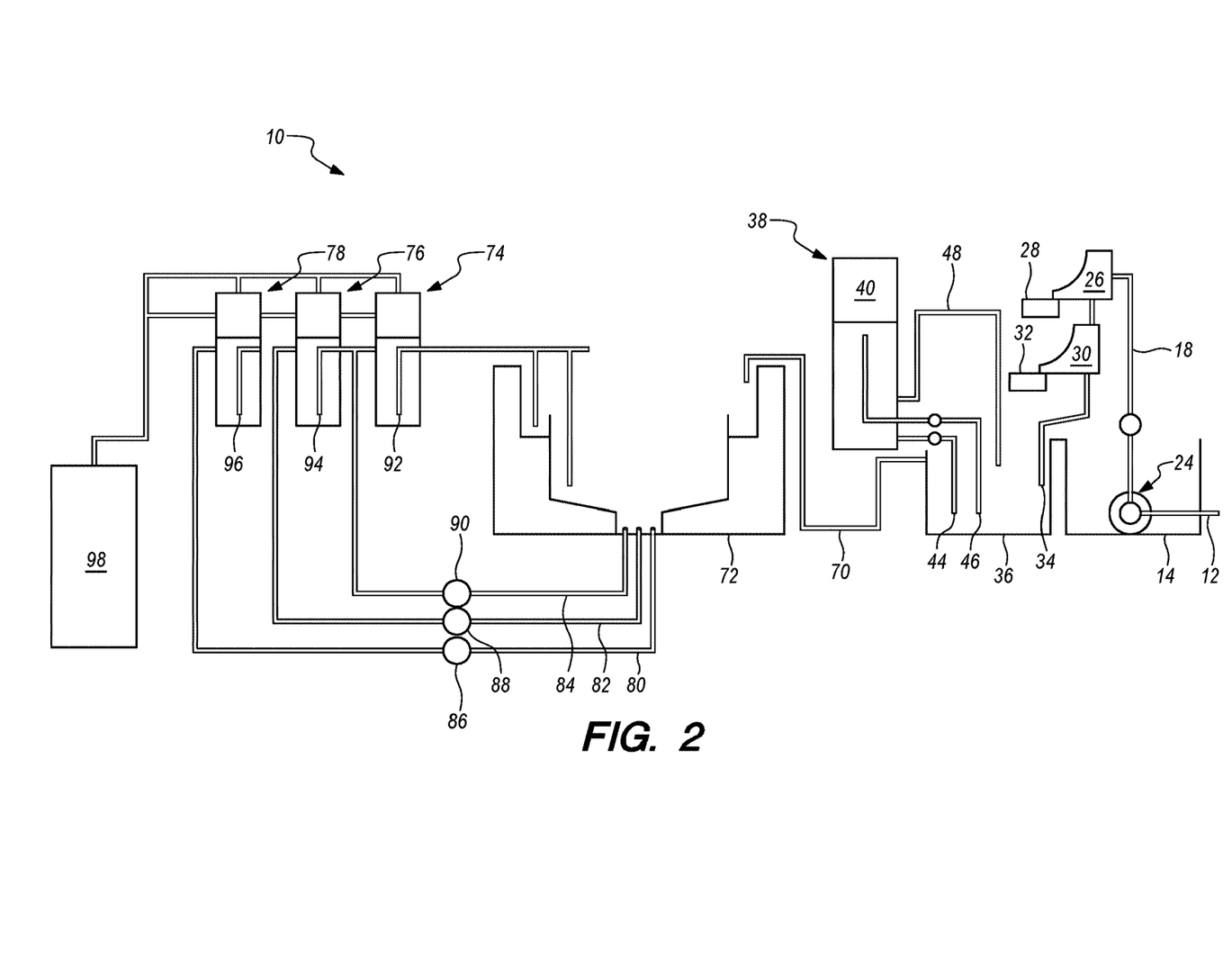
FIG. 2 is another schematic representation of the embodiment seen in FIG. 1.
Figure 3:
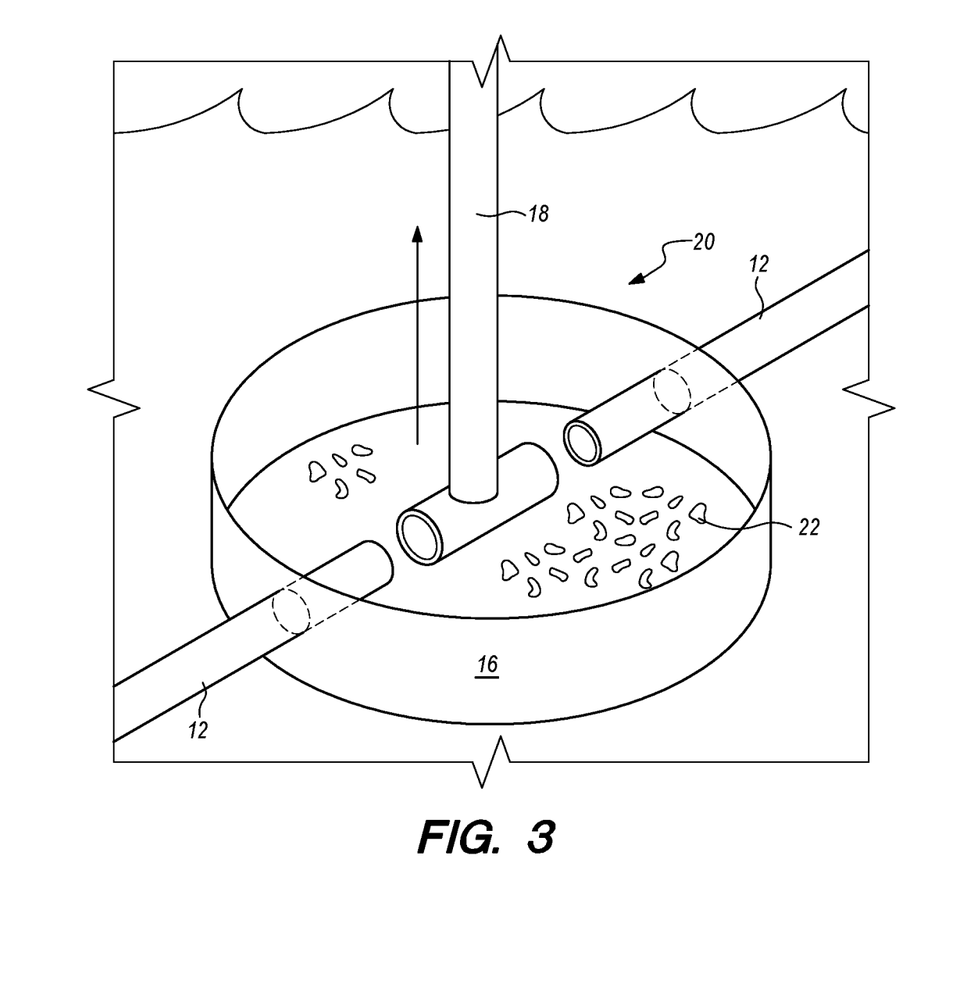
FIG. 3 is a detailed perspective view of a first focal point of the embodiment seen in FIG. 1.

As best seen in FIGS. 1 and 3, raw wastewater from inlet 12 enters sump 14 having a ring 16 contained therewithin. This focal point 20 allows the solids 22 and other heavy particulates to gather inside the ring 16 where a conveyor (not shown) may be used to cart them away when desired. A variable speed pump 24 with level sensor is in communication with feed line 18 and is disposed within ring 16. When the water level inside sump 14 gets too high, the pump 24 feeds wastewater up line 18 to one or more filters. As seen in FIG. 2, filter 28 is the first filter in the process wherein particulates larger than the holes in the screen 28 are removed onto tray 28. Fine filter 30 is then used to continue to strain the wastewater, wherein filter 30 also has its own tray 32 to which particulates removed from the wastewater will be placed. Second filter 30 is in communication with a second sump 36 through screened water line 34.

Figure 4:
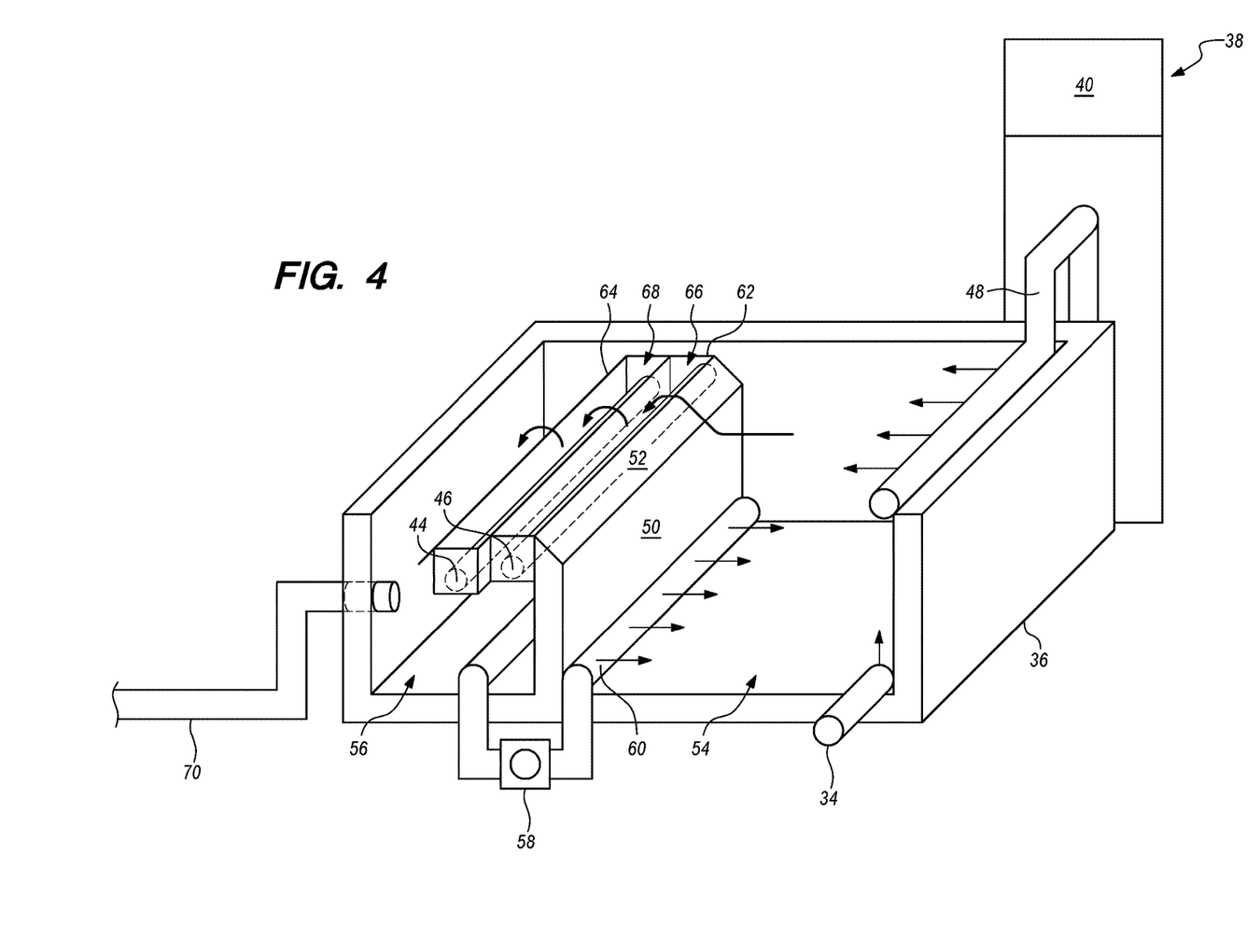
FIG. 4 is a detailed perspective view of the second sump with partition wall forming a main tank and a gathering tank in communication with a protein skimmer illustrating how a horizontal vortex is formed by inlet positioning within the main tank.

One or more protein skimmers is preferably also in communication with sump 36 to treat the wastewater coming from line 34 into the sump 36. FIGS. 1, 2, and 4 illustrate the use of a single protein skimmer 38 preferably capable of processing 600 gallons per minute preferably with the use of ozone at 30 gallons per hour as a flocculant and oxidizer. Skimmer 38 includes a foam waste capture cup 40 disposed at the top. As seen in FIG. 1, a foam waste line 42 is in communication with the cup 40 and a sewer or tank (not shown) where the foam containing impurities removed from the wastewater will be sent.

Protein skimmer 38 may have one or more feed lines and return lines. FIGS. 1, 2, and 4 illustrate protein skimmer 38 with a first skimmer feed line 44 and a second skimmer feed line 46, with a skimmer return line 48.

Turning in detail to FIG. 4, sump 36 preferably includes a partition wall 50 having a knife edge 52 at its top. The partition wall 50 splits sump 36 into two parts: a main tank 54 and a gathering tank 56. A recirculating pump 58 is disposed within sump 36. Pump 58 includes a recirculating return inlet 60 disposed preferably at the bottom left corner of the main tank 54 as seen in FIG. 4. Doing so allows wastewater to leave inlet pipe 60 substantially parallel to and along the bottom floor of main tank 54. Screen water line 34 is preferably disposed at the bottom right corner of main tank 54. Doing so allows wastewater to enter from this line 34 and proceed up the right side wall of the main tank 54. Protein skimmer return line 48 is preferably disposed at the top right corner of main tank 54. Doing so allows wastewater to enter from this line 48 substantially parallel to and along the top of main tank 54.

This positioning and/or placement of lines 34, 48, and 60 creates a cross-flow or horizontal vortex within main tank 54. Wastewater is propelled from this horizontal vortex over partition wall 50 and across knife edge 52. Here, the wastewater enters a first collection chamber 62, where it will eventually flow into a second collection chamber 64. Protein skimmer feed line 46 is disposed within first collecting chamber 62 in such manner that line 46 diverts and reverses the flow of water from the cascading flow of water within chamber 62. The reversing and opposing flow of water within chamber 62 acts a second focal point 66, i.e., particulates within the water are gathered and separated in the controlled flow around line 46 to allow them to be extracted by a series of inlet holes (not shown) in line 46. Protein skimmer feed line 44 is also preferably disposed with the second collecting chamber 64 such that line 44 diverts and reverses the flow of water from the cascading flow of water into chamber 64. Again, the reversing and opposing flow of water within chamber 64 acts a third focal point 66, i.e., particulates within the water are gathered and separated in the controlled flow around line 44 to allow them to be extracted by a series of inlet holes (not shown) in line 44. Accordingly, the second and third focal points 66, 64, as well as the first focal point 20, all function without the need for any chemicals, thereby reducing operating costs and solving other problems.

Depending on the desired level of purity of the water, further treatment of the water may be obtained with the use of one or more additional sumps in communication with one or more protein skimmers. FIGS. 1 and 2 illustrate the use of a third sump 72 in communication with sump 36 via overflow line 70. Sump 72 is in communication with secondary skimmers 74, 76, and 78, each of which is preferably capable of processing 600 gallons per minute preferably with the use of ozone at 30 gallons per hour. Feed lines 80, 82, and 84 are in communication with skimmers 78, 76, and 74, respectively, that suction water within sump 72. Return lines 92, 94, and 96 are in communication with skimmers 74, 76, and 78, respectively to return water to sump 72 after being processed by their respective skimmer. As seen in FIG. 2, foam waste extracted from each skimmer, 74, 76, 78 may be stored in sewer or tank 98. As seen in FIG. 1, treated water may leave sump 72 through suction line 100, enter pump room 102, and be returned to the ecosystem via one or more sprinkler heads such as heads 104, 106, 108.

Figure 5:
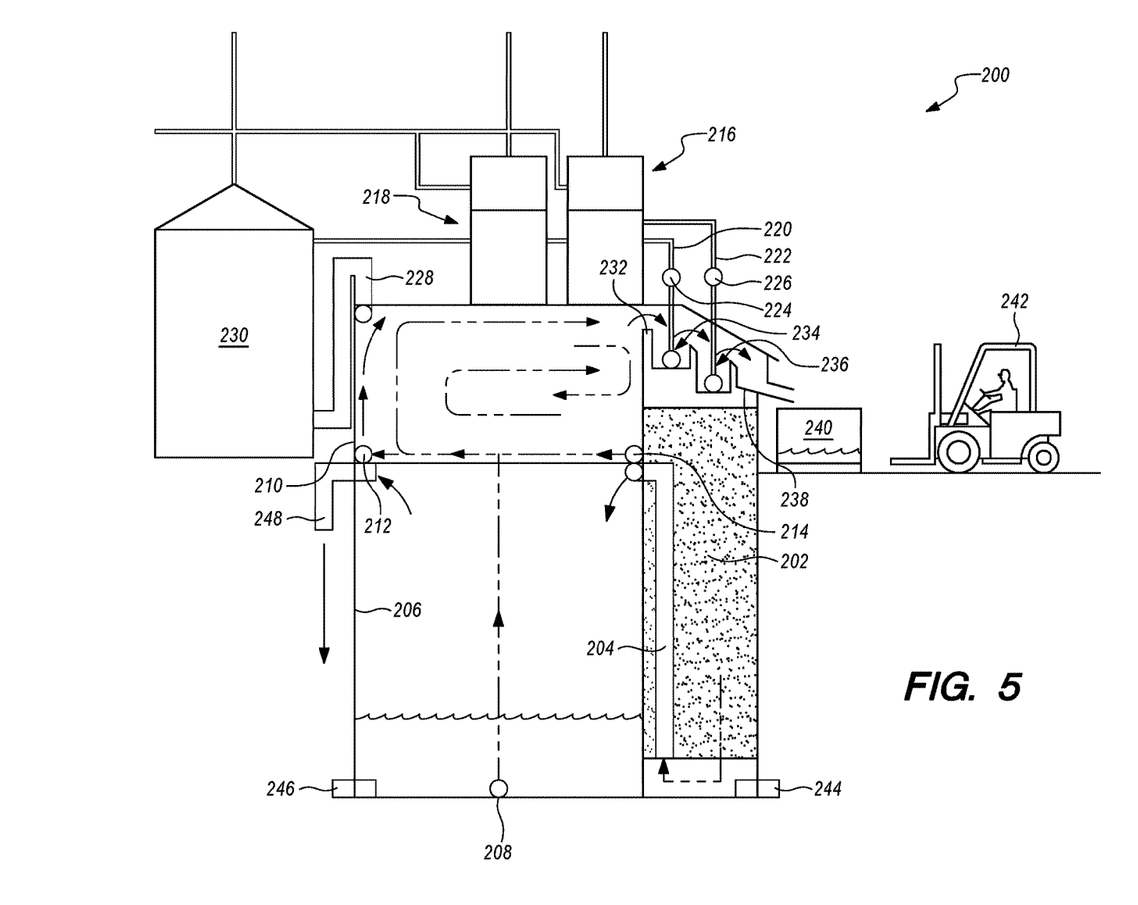
FIG. 5 is a schematic representation of another embodiment of the wastewater treatment system disclosed herein.

FIG. 5 illustrates another embodiment of the wastewater treatment system 200 disclosed herein. As seen in FIG. 5, wastewater passes through biofilter 202, through inlet 204, into buffer tank 206. From there, the water is pumped via pump 208 to the main tank 210. The water enters main tank 201 via inlet pipes 212, 214. Pipe 210 is preferably disclosed in the bottom left corner of tank 210. Pipe 214 is preferably disclosed in the bottom right corner of tank 210.

One or more protein skimmers may be in communication with main tank 210. FIG. 5 shows the use of two protein skimmers 216, 218 preferably capable of processing 300 gallons per minute preferably with the use of ozone at 30 gallons per hour. Should one skimmer be used, then this skimmer should be capable of processing 600 gallons per minute with the use of ozone at 30 gallons per hour. Protein skimmer feed line 220 is in communication with skimmer 216 and pump 226, whereas skimmer feed line 220 is in communication with skimmer 218 and pump 224. Skimmer return line 228 is communication with ozone tank 230, each skimmer 216, 218, and the main tank 210. The return line 228 is preferably disposed at the top left corner of the main tank 210. Similar to the disclosure in the context of FIG. 4, the positioning of pipes 228, 212, and 214 create a cross-flow effect or horizontal vortex within tank 210. Such vortex permits water to cascade over the partition wall 232 into first and second collecting chambers containing feed lines 220, 222.

As with the disclosure in the context of FIG. 4, lines 220 and 222 are each disposed within their respective collecting chamber 62 in such manner that each line 220, 222 diverts and reverses the flow of water from the cascading flow of water within the chamber. The reversing and opposing flow of water within the first chamber acts a first focal point 234, i.e., particulates within the water are gathered and separated in the controlled flow around line 220 to allow them to be extracted by a series of inlet holes (not shown) in line 220. The reversing and opposing flow of water within the second chamber acts a second focal point 236, i.e., particulates within the water are gathered and separated in the controlled flow around line 222 to allow them to be extracted by a series of inlet holes (not shown) in line 222. Water that continues to cascade over the second chamber is allowed to fall through one or more screen filters 238. Captured waste may then be contained in waste box to be removed by forklift 242 when desired. Water passing through screens 238 then pass through biofilter 202, wherein the process may be repeated. Drains 244 and 246 permit ease of maintenance. Moreover, waste collected within the main tank 210 may be removed via a solids conveyor not shown. A clean water outlet 248 permits treated water to exit the system 200.

The wastewater treatment systems disclosed herein have numerous advantages compared to conventional systems. For example, raw wastewater from a seafood processing facility may be treated with the disclosed inventions resulting in treated water with no smell, is potable, and with a 94.9% reduction in BOD and an 80% reduction in TSS. The disclosed inventions may be easily modified by adding or subtracting the number of protein skimmers in use, for example. Moreover, as the first and secondary focal points use no chemicals, and due to various other disclosed features, these systems are efficient as well as economical to operate. Indeed, the system 10 illustrated in FIGS. 1-4 may be operated for as little as USD $2.26 per hour.

While certain embodiments have been described, the embodiments have been presented by way of example only and are not intended to limit the scope of the inventions. Indeed, the novel wastewater treatment system disclosed herein may be embodied in a variety of other forms. Furthermore, various omissions, substitutions, and changes in the form of the disclosed elements may be made without departing from the spirit of the inventions. The accompanying claims and their equivalents are intended to cover such forms or modifications as would fall within the scope and spirit of the inventions.

The invention claimed is:

1. A wastewater treatment system comprising:
a first sump for receiving wastewater to be treated;
a first focal point inside the first sump for gathering the wastewater into a focused area;
a filter for screening the wastewater after it leaves the first focal point;
a second sump for receiving the wastewater after it leaves the filter;
a second focal point inside the second sump for gathering suspended solids from the wastewater contained in the second sump;
a protein skimmer for receiving the suspended solids from the second focal point and returning treated wastewater to the second sump;
wherein the first focal point includes a ring inside the first sump; and
wherein the second focal point includes a horizontal vortex formed by swirling water in the second sump.

2. The wastewater treatment system of claim 1, wherein the first and second focal points do not use chemicals to gather the wastewater.

3. The wastewater treatment system of claim 1, wherein the horizontal vortex is formed by the wastewater returning from the protein skimmer at the top portion of the second sump at one end thereof, the wastewater from the filter entering at the bottom portion of the second sump parallel to the wastewater returning from the protein skimmer, and wastewater being recirculated in the second sump and pumped into the bottom portion of the second sump opposite where the wastewater enters from the filter.

4. The wastewater treatment system of claim 1, further comprising a third focal point inside the second sump.

5. The wastewater treatment system of claim 1, further comprising a partition wall separating the second sump into a holding tank and a gathering tank, and further comprising a collecting chamber disposed at a top portion of the partition wall, wherein the horizontal vortex forces water to cascade over the partition wall into the collecting chamber.

6. The wastewater treatment system of claim 5, wherein the protein skimmer receives the suspended solids from a feed line disposed within the collecting chamber, wherein the feed line is positioned within the collecting chamber to divert and reverse the flow of water from the cascading flow over the partition wall.

7. The wastewater treatment system of claim 1, further comprising:
a third sump for receiving wastewater from the second sump,
a second protein skimmer in communication with the third sump,
a third protein skimmer in communication with the third sump,
a fourth protein skimmer in communication with the third sump,
a suction line from the third sump to a pump room, and one or more sprinkler heads in communication with the pump room.

8. The wastewater treatment system of claim 1, wherein ozone is added to the wastewater before it enters the protein skimmer.

9. The wastewater treatment system of claim 1, further comprising a biofilter in communication with the filter for further treating the wastewater after it leaves the filter.

10. A wastewater treatment system comprising:
a first sump having a ring for receiving and gathering wastewater to be treated;
a first filter for screening the wastewater after it leaves the first sump;
a second filter for screening the wastewater after it leaves the first filter;
a second sump having a partition wall defining a main tank and a gathering tank, wherein the gathering tank includes a first collecting chamber disposed atop the partition wall, and wherein the gathering tank includes a second collecting chamber disposed adjacent the first collecting chamber;
a first protein skimmer in communication with the second sump;
a first inlet in communication with second filter, wherein the first inlet is disposed at a bottom corner of the main tank opposite the partition wall;
a second inlet in communication with first protein skimmer, wherein the second inlet is disposed at a top corner of the main tank opposite the partition wall;
a pump having a third inlet in communication with the main tank, wherein the third inlet is disposed at a bottom corner of the main tank adjacent the partition wall;
a first feed line in communication with the first protein skimmer, wherein the first feed line is disposed in the first collecting chamber of the gathering tank; and
a second feed line in communication with the first protein skimmer, wherein the second feed line is disposed in the second collecting chamber of the gathering tank.

11. The wastewater treatment system of claim 10, further comprising:
a third sump for receiving wastewater from the second sump,
a second protein skimmer in communication with the third sump,
a third protein skimmer in communication with the third sump,
a fourth protein skimmer in communication with the third sump,
a suction line from the third sump to a pump room, and one or more sprinkler heads in communication with the pump room.

12. The wastewater treatment system of claim 11, wherein ozone is added to the wastewater before it enters each protein skimmer.

13. A wastewater treatment system comprising:
a first sump for receiving wastewater to be treated;
a first focal point comprising a ring inside the first sump for gathering the wastewater into a focused area;
a first filter for screening the wastewater after it leaves the first focal point;
a second filter for screening the wastewater after it leaves the first filter;
a second sump for receiving the wastewater after it leaves the second filter;
a second focal point inside the second sump for gathering suspended solids from the wastewater contained in the second sump;
a first protein skimmer for receiving the gathered suspended solids from the second sump;
a third sump for receiving treated wastewater from the second sump, a second protein skimmer in communication with the third sump,
a third protein skimmer in communication with the third sump,
a fourth protein skimmer in communication with the third sump,
a suction line from the third sump to a pump room, and
one or more sprinkler heads in communication with the pump room.

14. The wastewater treatment system of claim 13, further comprising a partition wall separating the second sump into a holding tank and a gathering tank, and further comprising a collecting chamber disposed at a top portion of the partition wall.

15. The wastewater treatment system of claim 14, wherein the first protein skimmer receives the suspended solids from a feed line disposed within the collecting chamber.

* * * * *